US012602811B2

(12) United States Patent (10) Patent No.: US 12,602,811 B2
Fukushima (45) Date of Patent: Apr. 14, 2026

(54) IMAGE PROCESSING SYSTEM

(71) Applicant: NTT DOCOMO, INC., Tokyo (JP)

(72) Inventor: Yusuke Fukushima, Tokyo (JP)

(*) Notice: Subject to any disclaimer, the term of this patent is extended or adjusted under 35 U.S.C. 154(b) by 567 days.

(21) Appl. No.: 18/005,440

(22) PCT Filed: Aug. 31, 2021

(86) PCT No.: PCT/JP2021/031984
§ 371 (c)(1),
(2) Date: Jan. 13, 2023

(87) PCT Pub. No.: WO2022/091569
PCT Pub. Date: May 5, 2022

(65) Prior Publication Data
US 2023/0267636 A1 Aug. 24, 2023

(30) Foreign Application Priority Data

Oct. 26, 2020 (JP) ................................. 2020-178807

(51) Int. Cl.
G06T 7/64 (2017.01)
G06T 7/50 (2017.01)
(Continued)

(52) U.S. Cl.
CPC .................. G06T 7/64 (2017.01); G06T 7/50 (2017.01); G06T 7/62 (2017.01); G06V 10/25 (2022.01);
(Continued)

(58) Field of Classification Search
CPC ... G06T 2207/30176; G06T 7/62; G06T 7/50; G06T 7/64; G06T 2210/12; G06T 2210/08; G06V 10/25; G06V 10/46; G06V 10/469
See application file for complete search history.

(56) References Cited

U.S. PATENT DOCUMENTS 11,073,690 B2 * 7/2021 Ng-Thow-Hing ... G02B 27/017

FOREIGN PATENT DOCUMENTS

CN 111754461 A * 10/2020 ............. G06T 7/155
JP H9-097343 4/1997
(Continued)

OTHER PUBLICATIONS

International Preliminary Report on Patentability with Written Opinion dated May 11, 2023 or PCT/JP2021/031984.
(Continued)

*Primary Examiner* — Matthew C Bella
*Assistant Examiner* — Janice E. Vaz
(74) *Attorney, Agent, or Firm* — SHIPWAY IP

(57) ABSTRACT

A portion of a polygon is appropriately extracted from an image. An image processing system 10 including: an input unit 11 that inputs an image including an extraction target; a detection unit 12 that detects a portion of the extraction target from an input image; a convex hull generating unit 13 that generates a convex hull, which is a polygonal, of the detected portion; a vertex reducing unit 14 that acquires a polygon having a preset number of vertices from the convex hull by repeating a vertex reducing process of eliminating a vertex according to each interior angle of the polygon; and an extraction unit 15 that extracts a portion of the acquired polygon described above from the input image, in which the vertex reducing process is a process of determining a new line based on an area of a region surrounded by the new line passing through a vertex to be eliminated, two sides generating the vertex in the polygon, and two lines acquired by extending two adjacent sides of the vertex in the polygon and generating a polygon after elimination of the vertex using the determined new line and the two extended lines.

20 Claims, 13 Drawing Sheets

(51) Int. Cl.
  *G06T 7/62*        (2017.01)
  *G06V 10/25*      (2022.01)
  *G06V 10/46*      (2022.01)
(52) U.S. Cl.
  CPC .... *G06V 10/46* (2022.01); *G06T 2207/30176*
                                          (2013.01)

(56)                    References Cited

FOREIGN PATENT DOCUMENTS

JP        H11-183159        7/1999
JP        2000-076464       3/2000
JP        2004-030430       1/2004
JP        2004-362053      12/2004

OTHER PUBLICATIONS

International Search Report dated Nov. 22, 2021 for PCT/JP2021/
031984.

* cited by examiner

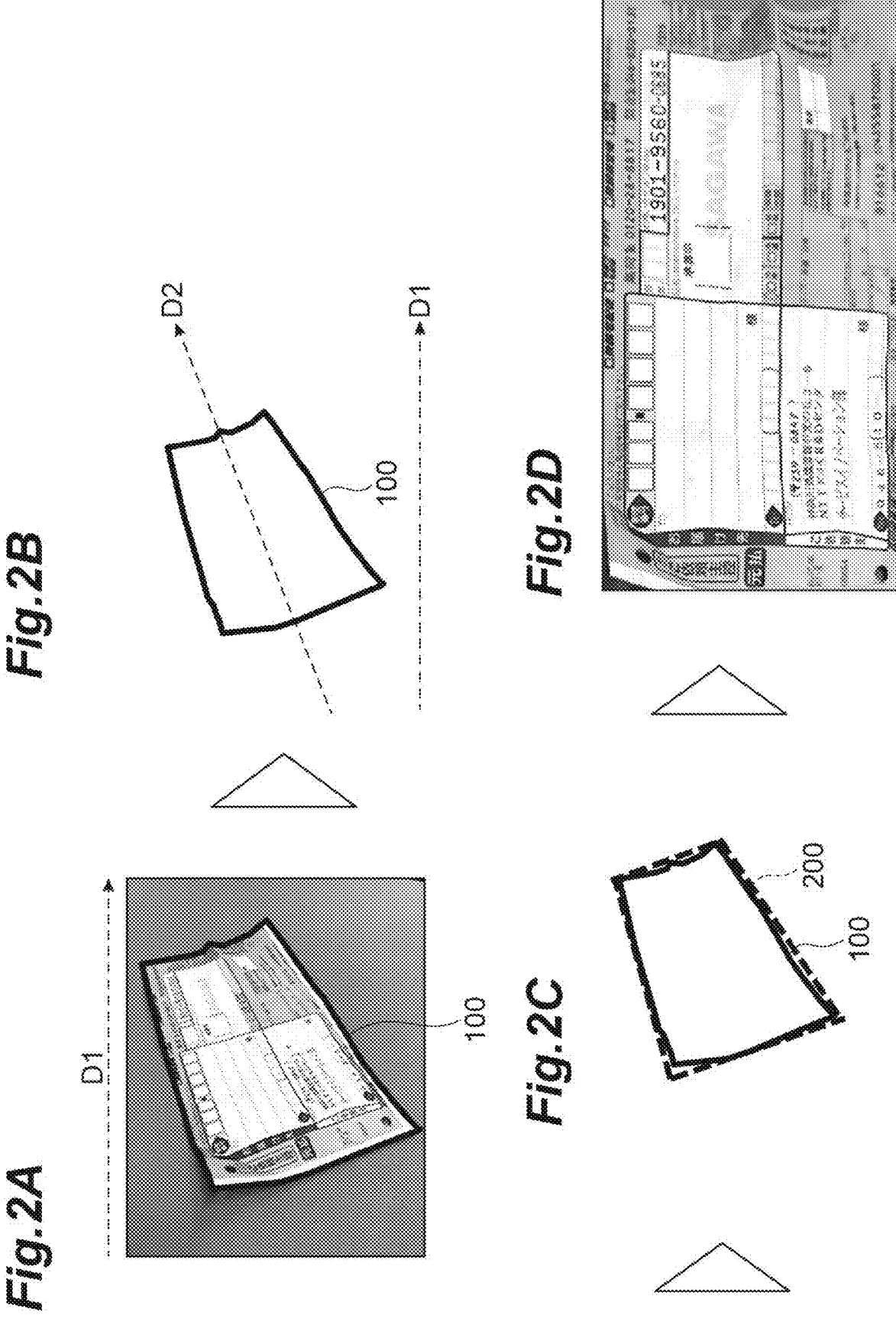

*Fig.3C*
*Fig.3B*
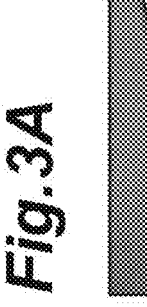
*Fig.3A*

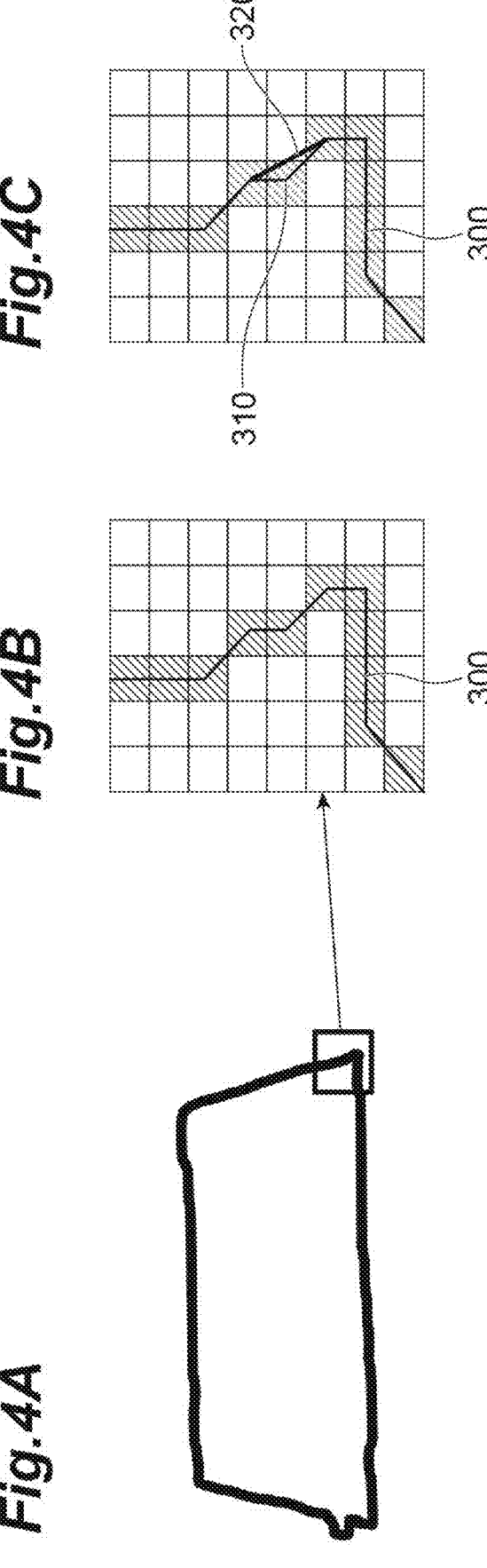

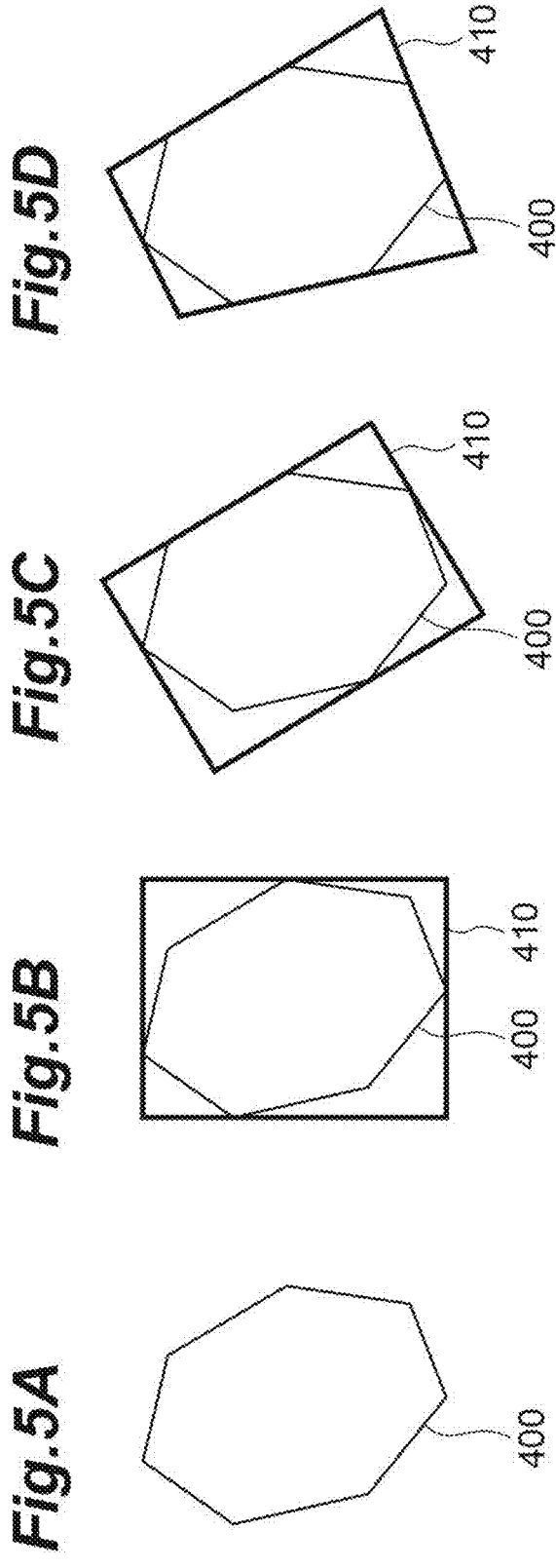

420          100

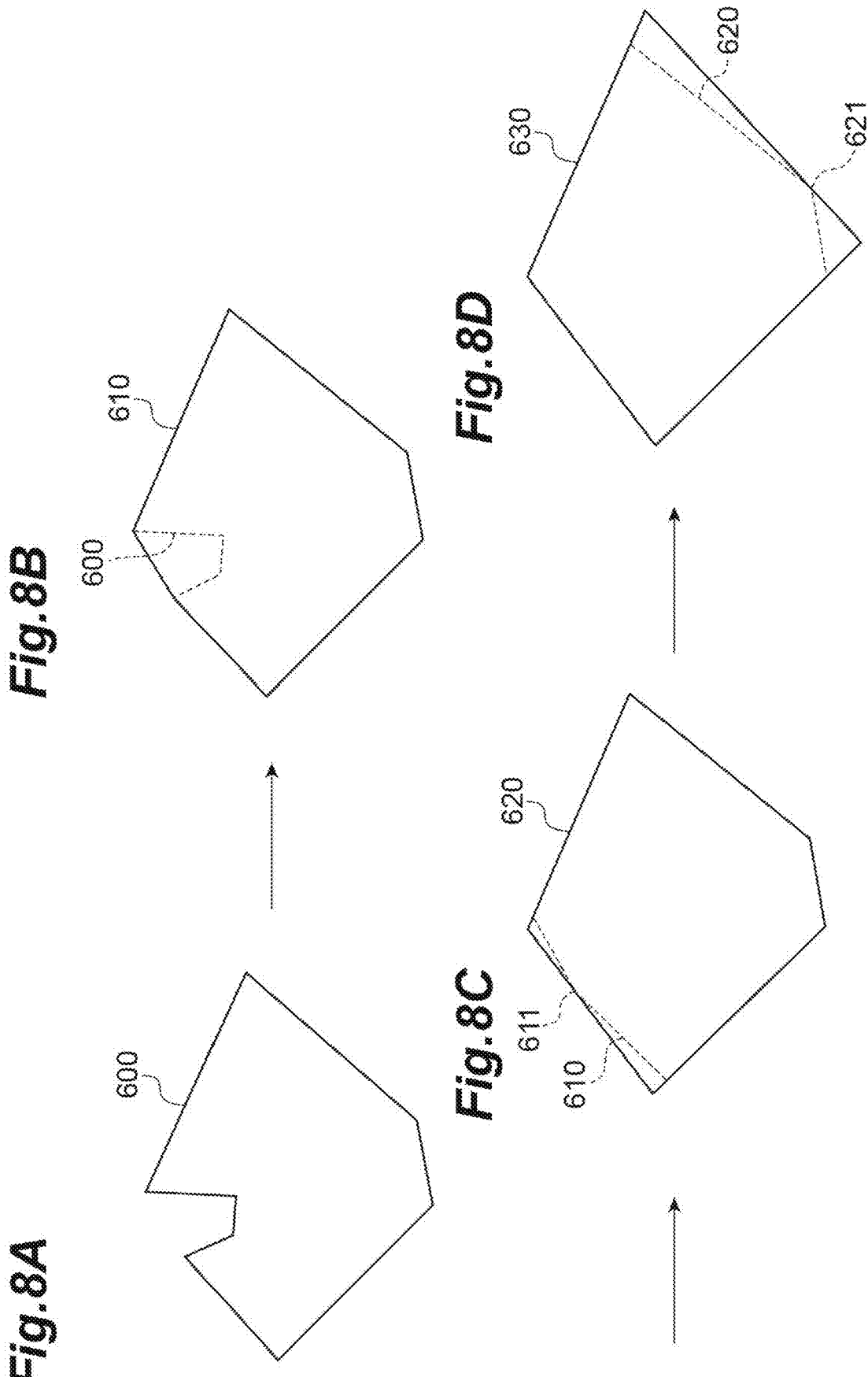

IMAGE PROCESSING SYSTEM

CROSS-REFERENCE TO RELATED APPLICATIONS

This application is a 35 U.S.C. § 371 national phase application of PCT/JP2021/031984, filed on Aug. 31, 2021, which claims priority to Japanese Patent Application No. 2020-178807, filed on Oct. 26, 2020.

TECHNICAL FIELD

The present invention relates to an image processing system.

BACKGROUND ART

Conventionally, a method for extracting a rectangular portion from an image based on a histogram of the number of black pixels for each direction of the image has been proposed (for example, see Patent Literature 1).

CITATION LIST

Patent Literature

[Patent Literature 1] Japanese Unexamined Patent Publication No. 2004-30430

SUMMARY OF INVENTION

Technical Problem

In a case in which an invoice (a tag label) attached to delivered parcel is imaged, a part of the invoice in the captured image may appear as a non-rectangular quadrilateral depending on an imaging angle. In such an invoice, breakage, wrinkles, and the like may occur in the process of delivery, and it is required to appropriately extract a portion of the invoice even when breakage, wrinkles, and the like occur. In the method described in Patent Literature 1, the points described above are not considered, and, for example, a portion of an invoice may not be appropriately extracted from the image described above.

One embodiment of the present invention is in consideration of the description presented above, and an object thereof is to provide an image processing system capable of appropriately extracting a portion of a polygon from an image.

Solution to Problem

In order to achieve the objects described above, according to one embodiment of the present invention, there is provided an image processing system including: an input unit that inputs an image including an extraction target; a detection unit that detects a portion of the extraction target from the image input by the input unit; a convex hull generating unit that generates a polygonal convex hull of the portion detected by the detection unit; a vertex reducing unit that acquires a polygon having a preset number of vertices from the convex hull generated by the convex hull generating unit by repeating a vertex reducing process of eliminating a vertex according to each interior angle of the polygon; and an extraction unit that extracts a portion of the polygon acquired by the vertex reducing unit from the image input by the input unit, in which the vertex reducing process is a process of determining a new line based on an area of a region surrounded by the new line passing through a vertex to be eliminated, two sides generating the vertex in the polygon, and two lines acquired by extending two adjacent sides of the vertex in the polygon and generating a polygon after elimination of the vertex using the determined new line and the two extended lines.

In the image processing system according to one embodiment of the present invention, a portion of a polygon having a preset number of vertices, which is not limited to a rectangle, is extracted from an image. In addition, in the image processing system according to one embodiment of the present invention, for example, even in a case in which breakage, wrinkles, and the like occur in an extraction target in an image, a portion of an appropriate polygon including the entire portion that is the detected extraction target may be extracted. In this way, according to the image processing system of one embodiment of the present invention, a portion of a polygon may be appropriately extracted from an image.

Advantageous Effects of Invention

According to one embodiment of the present invention, a portion of a polygon may be appropriately extracted from an image.

BRIEF DESCRIPTION OF DRAWINGS

FIGS. 2A-2D are diagrams illustrating an overview of image processing in an image processing system.

FIGS. 3A-3C are diagrams illustrating an example of an image used for detecting a contour of a portion of an extraction target.

FIGS. 4A-4C are diagrams illustrating an example of a contour of a portion of an extraction target in an image.

FIGS. 5A-5D are diagrams illustrating an example of a quadrilateral that is in contact with a polygon from the outside.

FIGS. 8A-8D are diagrams illustrating a polygon in the process of generation of convex hulls and a vertex reduction process.

DESCRIPTION OF EMBODIMENTS

Hereinafter, an image processing system according to an embodiment of the present invention will be described in detail with reference to the drawings. In description of the drawings, the same reference signs will be assigned to the same elements, and duplicate description will be omitted.

Figure 1:
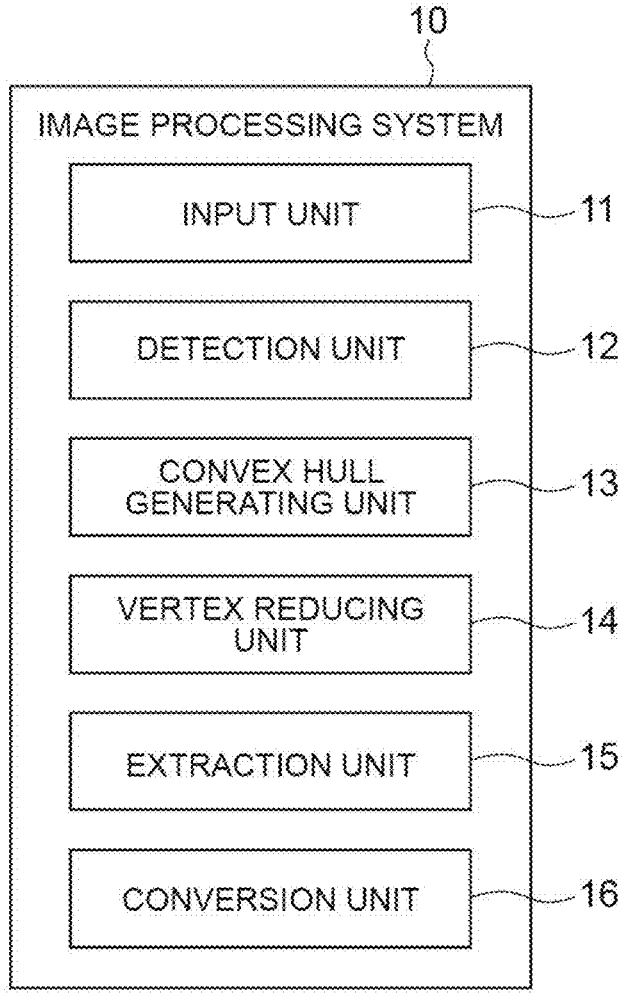
FIG. 1 is a diagram illustrating a configuration of an image processing system according to an embodiment of the present invention.

FIG. 1 is a diagram illustrating an image processing system 10 according to this embodiment. The image processing system 10 is a system (apparatus) that extracts (cuts out) a portion of a polygon including an extraction target from an image including the extraction target (a subject). This image, for example, is an image of an invoice (tag label) attached to delivered parcel illustrated in FIG. 2A. The extraction target is a portion of an invoice. This image may be acquired by imaging (photographing) a portion of an invoice in an arbitrary direction. An invoice has a rectangular shape, and when imaged with an inclination, a three-dimensional inclination is applied to a portion of the invoice in the image. For this reason, as in an image illustrated in FIG. 2A, this portion is not a rectangle in the image. In addition, breakage, wrinkles, and the like may occur in an invoice, in which case a portion (contour) of the invoice in the image may not appear in a quadrilateral shape. The image processing system 10 extracts a quadrilateral portion including a portion of an invoice from such an image.

As illustrated in FIGS. 2A-2D, the image processing system 10 extracts a quadrilateral portion including a portion of an invoice from the image. First, as illustrated in FIG. 2B, the image processing system 10 extracts a contour 100 of a portion of an invoice. As described above, the contour 100 may be or may not be in a quadrilateral shape. Next, as illustrated in FIG. 2C, the image processing system 10 generates a quadrilateral 200 that is in contact with a contour 100 of a portion of an invoice from the outside and extracts a portion of the quadrilateral 200 of the image. As will be described below, this quadrilateral 200 is formed to include the entire extracted portion of the invoice, to include as little of portions other than the invoice as possible, and to be appropriate as a shape to be extracted. In addition, as illustrated in FIG. 2D, the image processing system 10 converts the extracted image into a rectangular shape. In other words, an image of an extraction target that is not imaged from the front is converted into an image as if it were imaged from the front. For example, the image acquired in this way may be used for management of invoices and the like. In addition, in this case, text recognition may be performed on the acquired image.

For an image that is a processing target of the image processing system 10, an entire extraction target, for example, an entire invoice, is assumed to be included (the entire invoice is shown) in the image. In other words, an extraction target of which a part is not shown in the image is not set as a processing target of the image processing system 10. In addition, an image of a processing target may be configured such that an inclination of a portion of an extraction target (e.g., a longitudinal direction D2 of the extraction target in FIG. 2B) with respect to a correct direction (for example, a direction in which text of an invoice is correctly aligned or an extending direction D1 of the image in FIGS. 2A and 2B) is within 45 degrees. In this case, a converted rectangular image with a correct orientation may be acquired. Here, an inclination of a part of an extraction target does not need to be set as described above.

A polygon extracted by the image processing system 10 may not be a quadrilateral but may be an arbitrary polygon (for example, a pentagon or a triangle) of which the number of vertices is set in advance. In addition, an extraction target shown in an image may not be an invoice but may be anything as long as an extraction portion is assumed to be a polygon. For example, a payment slip, a ticket, a check, a voucher, a delivery statement, a delivery goods list, a document evidence, or the like may be an extraction target instead of the invoice described above. In addition, the extracted image may be used not for management of information but for identification of a photographed object, determination of a type of document, or the like.

For example, the image processing system 10 may be realized by a computer such as a smartphone, a personal computer (PC) or a server apparatus. In addition, the image processing system 10 may be realized by a plurality of computers, that is, a computer system.

Next, functions of the image processing system 10 according to this embodiment will be described. As illustrated in FIG. 1, the image processing system 10 is configured to include the input unit 11, the detection unit 12, the convex hull generating unit 13, the vertex reducing unit 14, the extraction unit 15, and the conversion unit 16.

The input unit 11 is a functional unit that inputs an image including an extraction target. For example, the input unit 11 reads an image stored in a database of the image processing system 10 in advance to input the image. Alternatively, the input unit 11 may acquire an image in accordance with a user's operation (for example, an imaging operation of an object corresponding to an extraction target) on the image processing system 10 to input the image. Alternatively, the input unit 11 may receive an image from another device to input the image. In addition, the input unit 11 may input an image using a method other than those described above. The input unit 11 outputs the input image to the detection unit 12 and the extraction unit 15.

The detection unit 12 is a functional unit that detects a portion of an extraction target from an image input by the input unit 11. For example, the detection unit 12 detects a portion of the extraction target from an image as follows. The detection unit 12 receives an image from the input unit 11 as an input. The detection unit 12 detects a contour of a portion of an extraction target from an image using a conventional technology. More specifically, a contour of a region of which an area is a maximum is acquired from an image as a black/white image by performing Otsu's binarization or the like. This method may be used in a case in which a brightness difference between an extraction target and a background is large.

Alternatively, an input image as illustrated in FIG. 3A is converted into an HSV color space, thereby acquiring an image from which H (hue) is extracted as illustrated in FIG. 3B. The above-described binarization or the like is performed on the image from which H (hue) has been extracted, and a black/white image as illustrated in FIG. 3C is acquired. A contour of a portion of an extraction target is detected from the acquired black/white image. This method may be used in a case in which a brightness difference between an extraction target and a background is not large, and a tone is different between the extraction target and the background.

The detection unit 12 detects, for example, all the pixels configuring a contour of a portion of an extraction target and an order of the pixels using the method described above as the portion of the extraction target. In other words, the detection unit 12 detects a portion of an extraction target in a raster form (as a raster image). Alternatively, the detection unit 12 detects coordinates of vertices configuring a contour of a portion of an extraction target in the image and segments joining these coordinates as the portion of the extraction target. In other words, the detection unit 12 detects a portion of an extraction target in a vector form (as a vector image). A method for detecting a portion of an extraction target and information representing the portion of the extraction target are not limited those described above, and arbitrary method and information may be used. The detection unit 12 outputs information representing a portion of an extraction target that has been detected to the convex hull generating unit 13.

The convex hull generating unit 13 is a functional unit that generates a polygonal convex hull of the portion detected by the detection unit 12. The convex hull generating unit 13 generates a convex hull as follows. The convex hull generating unit 13 receives information of a contour of a portion input from the detection unit 12 as information representing the portion of an extraction target. The information of a contour is information that represents pixels configuring the contour and an order of the pixels (information in a raster form) or coordinates of vertices configuring a contour and segments joining the coordinates (information in a vector form). A contour represented by such information, that is, a contour handled as digital data, may be regarded as a polygon in a case in which the contour is a contour of any shape. FIG. 4B illustrates a part of the image of the contour in the raster form illustrated in FIG. 4A enlarged in units of pixels. As illustrated in FIG. 4B, when an image is enlarged, pixels are aligned in a lattice shape. In this way, in a case in which a contour is represented as information in the raster form, for example, the contour may be regarded as a polygon by sequentially joining centers of pixels configuring the contour using a line 300. In addition, in a case in which a contour is represented as information in the vector form as described above, the contour is originally in the shape of a polygon. The convex hull generating unit 13 first generates the polygon described above from information input from the detection unit 12.

Subsequently, the convex hull generating unit 13 generates convex hulls by converting the generated polygon into the convex hulls. For example, for a vertex at which interior angles of a polygon exceed 180 degrees (for example, a vertex 310 at which an interior angle is 225 degrees in FIG. 4C), the convex hull generating unit 13 joins vertices adjacent to the vertex using a line (for example, a line 320 illustrated in FIG. 4C) and sets the joined line as a side of a convex hull to be generated. The convex hull generating unit 13 generates a new side of the convex hull until there is no vertex at which an interior angle of the polygon exceeds 180 degrees. The convex hull generating unit 13 employs a vertex at which an interior angle of the polygon does not exceed 180 degrees as a vertex of the convex hull. The convex hull generating unit 13 generates a convex hull that is a polygon with n angles (here, n is an integer equal to or larger than 3) in this way.

Generation of a convex hull using the convex hull generating unit 13 described above is performed on a coordinate axis of the image. In addition, generation of a convex hull using the convex hull generating unit 13 may not be performed as above and may be performed using an arbitrary method. The convex hull generating unit 13 outputs information representing the generated convex hull to the vertex reducing unit 14. In the information representing a convex hull, information representing a position of the convex hull on the image is included.

The vertex reducing unit 14 is a functional unit that acquires a polygon having a preset number of vertices from a convex hull generated by the convex hull generating unit 13 by repeating a vertex reducing process of reducing vertices corresponding to each interior angle of the polygon. The vertex reducing process is a process of determining a new line on the basis an area of a region surrounded by the new line passing through a vertex to be reduced, two sides generating the vertex of the polygon, and two lines acquired by extending two adjacent sides of the vertex of the polygon and generating a polygon after reduction of the vertex using the determined new line and the two extended lines. In addition, the vertex reducing process is a process of reducing a vertex relating to a largest interior angle of the polygon, and a new line may be determined such that the area described above is the smallest.

A polygon generated by the vertex reducing unit 14 is a part that is extracted by the image processing system 10. An algorithm of conditionally acquiring a quadrilateral in contact with an arbitrary shape having n angles from the outside is known. For example, as such an algorithm, there is an algorithm for acquiring an Axis Aligned Bounding Box (AABB) that is a rectangle coming into contact from the outside along vertical and horizontal axes. In this algorithm, an AABB may be acquired by only calculating maximum values and minimum values of a polygon with n angles of upper, lower, left, and right sides. In addition, as such an algorithm, there is an algorithm for acquiring Oriented Bounding Box (OBB) that is a rectangle coming into contact with from the outside. However, in any one of the methods, a portion other than the polygon with n angles included in the quadrilateral is large, and the methods are not appropriate as a method for acquiring an extracted quadrilateral.

Description will be presented with reference to FIGS. 5A-5D. For a polygon with n angles (a hexagon) 400 illustrated in FIG. 5A, FIG. 5B illustrates a quadrilateral 410 that is an AABB, and FIG. 5C illustrates a quadrilateral 410 that is an OBB. In any one of such quadrilaterals 410, a portion other than the polygon 400 with n angles included in the quadrilaterals 410 is large and is not appropriate as a quadrilateral to be extracted. In this embodiment, the vertex reducing unit 14 acquires a quadrilateral using a method for which a portion other than a polygon 400 with n angles included in the quadrilateral 410 as illustrated in FIG. 5D is small.

Figure 6:
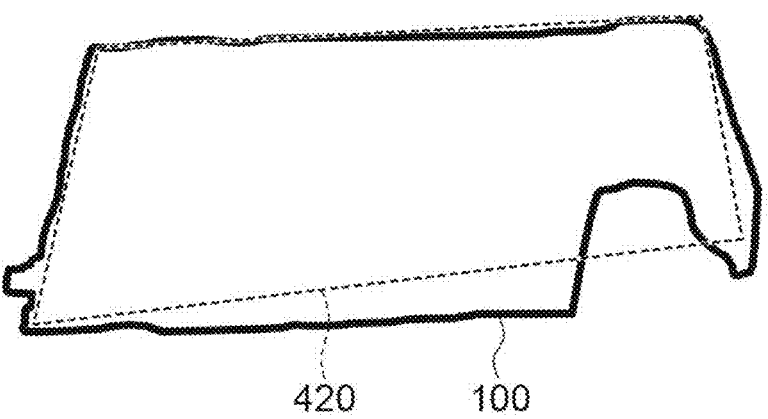
FIG. 6 is a diagram illustrating an example of a quadrilateral acquired from a contour of a portion that is an extraction target using a conventional method.

On the other hand, acquisition of a quadrilateral directly from a contour of an extraction target detected by the detection unit 12 (without performing generation of a convex hull and the like as described above) may be considered. For example, as a method for approximating a contour simply using four straight lines, there are methods as described below. There is a method in which one pixel configuring a contour is regarded as one point, and a contour is approximated using four straight lines using a least squares method or the like. In a case in which the least squares method is used, four straight lines in which a squared sum of distances from a straight line closest to all the points is minimized are drawn. Alternatively, there is a method using an algorithm for simplifying a polygonal line such as a Dauglas-Peucker algorithm. In such a method, although a quadrilateral that is in contact with a contour of an extraction target from the outside may not be acquired, a quadrilateral may be acquired. However, in the method described above, for example, as illustrated in FIG. 6, in a case in which noise causing a part of an invoice to be turned up occurs in an extraction target 100, a part of the extraction target 100 exceeds from an extracted quadrilateral 420. In this way, noise occurred in an extraction target 100 has a significant influence on the acquired quadrilateral 420. Thus, as in this embodiment, a quadrilateral that is in contact with an extraction target 100 from the outside may be generated.

By expanding a polygon with n angles, the vertex reducing unit 14 performs a vertex reducing process of reducing the number of vertices by one and acquires a polygon with (n−1) angles. By repeatedly performing the vertex reducing process, the vertex reducing unit 14 acquires a polygon having a preset number of vertices (in the example of the invoice described above, a quadrilateral) from the convex hull generated by the convex hull generating unit 13. The vertex reducing unit 14 acquires a quadrilateral as below.

Figures 7A, 7B, 7C:
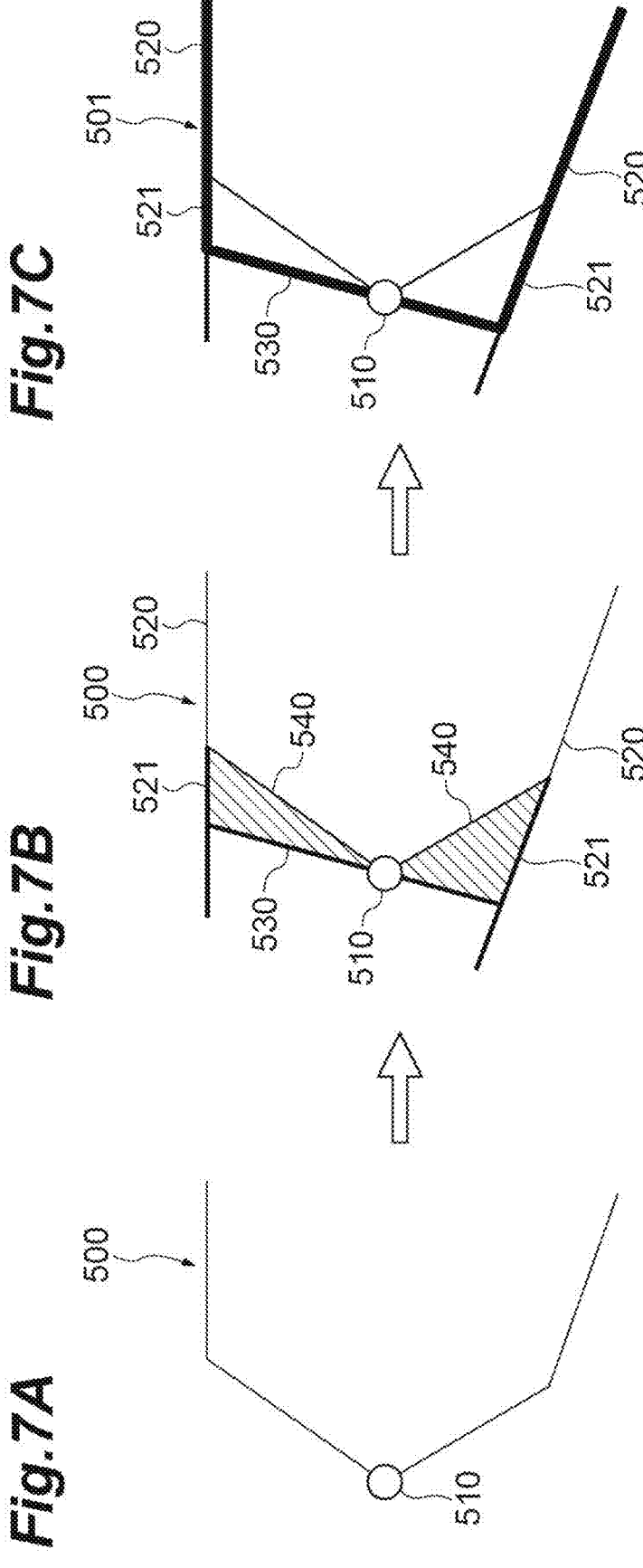
FIGS. 7A-7C are diagrams illustrating a vertex reduction process.

The vertex reducing unit 14 inputs information representing a polygon with n angles that is a convex hull from the convex hull generating unit 13. As illustrated in FIG. 7A, the vertex reducing unit 14 selects a vertex 510 (elimination target vertex) relating to the largest interior angle of the polygon 500 with n angles represented in the input information as a vertex to be eliminated. Subsequently, as illustrated in FIG. 7B, the vertex reducing unit 14 extends second adjacent sides 520 (the sixth side and the seventh side) of the vertex 510 to be eliminated towards the vertex. The vertex reducing unit 14 determines a straight line 530 (the first side) such that an area of a region (a region of two triangles represented in FIG. 7B) surrounded by the straight line 530 passing through the vertex 510 to be eliminated, two sides 540 (the second side and the third side) generating the vertex 510 of the polygon 500, and two straight lines 521 (the fourth side and the fifth side) acquired by extending two adjacent sides 520 (the sixth side and the seventh side) to two sides 540 becomes a minimum. A variable of the straight line 530 is only an inclination x. When x is acquired, positions of three vertices of two triangles are acquired. For this reason, an area of the region (a sum of areas of the two triangles) is acquired using x equations. x causing this area to be a minimum may be acquired. In addition, the straight line 530 may overlap with any one of the two sides 540 generating the vertex 510. In such a case, the area of the two triangles described above is an area of one triangle.

As illustrated in FIG. 7C, the vertex reducing unit 14 eliminates the selected vertex 510 and sets the determined straight line 530 and portions of the two extended straight lines 521 until intersecting with the straight line 530 as sides of a polygon 501 with (n−1) angles acquired by eliminating the vertex, thereby acquiring the polygon 501 of (n−1) angles. The vertex reducing unit 14 repeatedly performs the vertex reducing process described above until an acquired polygonal becomes a polygonal having a preset number of vertices (in the example of the invoice described above, a quadrilateral).

Generation of a polygonal (in the example of the invoice described above, a quadrilateral) using the vertex reducing unit 14 is performed on a coordinate axis of the image. In addition, reduction of vertices of polygons with n angles using the vertex reducing unit 14 may not be performed as described above and may be performed based on the area described above by reducing vertices corresponding to interior angles of a polygon. The vertex reducing unit 14 outputs information representing the acquired polygonal to the extraction unit 15. In the information representing the polygon, information representing a position of the polygon on the image is included.

The detection of a portion that is an extraction target using the detection unit 12, the process of generating a convex hull using the convex hull generating unit 13, and the generation of a polygon using the vertex reducing unit 14 will be described with reference to FIGS. 8A-8D. As illustrated in FIG. 8A, a contour 600 of an extraction target is detected by the detection unit 12. Subsequently, as illustrated in FIG. 8B, a hexagon 610 that is a convex hull of the contour 600 is generated by the convex hull generating unit 13. Subsequently, as illustrated in FIG. 8C, a vertex 611 relating to the largest interior angle of the hexagon 610 is eliminated by the vertex reducing unit 14, and a pentagon 620 is generated. Subsequently, as illustrated in FIG. 8D, a vertex 621 relating to the largest interior angle of the pentagon 620 is eliminated by the vertex reducing unit 14, and a quadrilateral 630 is generated.

Figure 9:
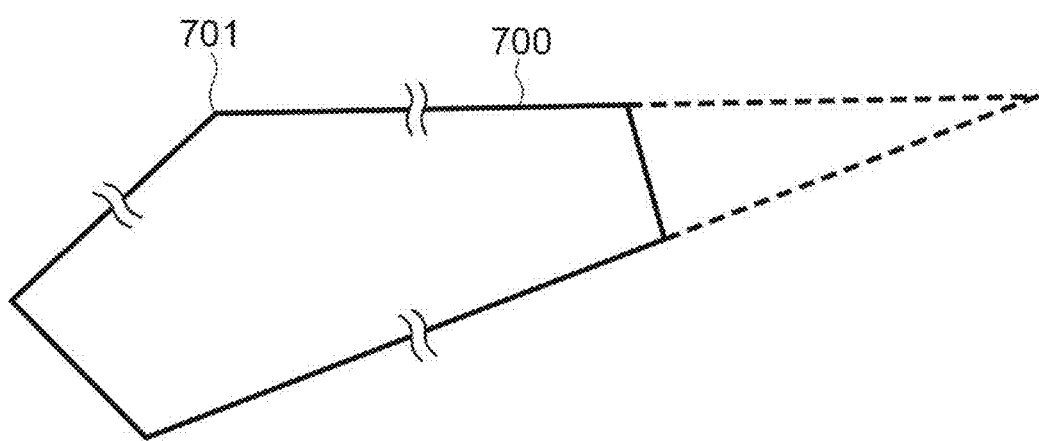
FIG. 9 is a diagram illustrating an example of a minimum-area quadrilateral acquired from a polygon.

In the method described above, it is not assured that a polygon with (n−1) angles which is in contact with the polygon with n angles from the outside and of which an area becomes a minimum. For example, a pentagon illustrated in FIG. 9 will be considered. In the drawing, a wave line represents a sufficiently long line. In the case of the pentagon illustrated in FIG. 9, by using the technique described above, a quadrilateral having the smallest area may not be acquired. In the pentagon illustrated in FIG. 9, although the vertex 701 is selected as a vertex to be eliminated, two sides generating the vertex 701 are sufficiently long, and thus an area of two triangles that are generated becomes large. A quadrilateral having portions denoted by broken lines as its sides is a smallest-area quadrilateral that is in contact with the pentagon 700 from the outside.

Actually, when an extraction target is to be imaged in such a shape, it is necessary to perform imaging substantially right beside (edge-on). For this reason, in a case in which an imaging person has an intention to image an extraction target, it is difficult for the extraction target to form such a shape on the image. An object of this embodiment is not to acquire a quadrilateral having a minimum area but to acquire a quadrilateral that is appropriate for conversion into an image as if it is captured from the front. Thus, even when a distorted quadrilateral is acquired by focusing on minimization of an area, the object is not achieved.

The extraction unit 15 is a functional unit that extracts a portion of a polygon acquired by repeating the vertex reducing process using the vertex reducing unit 14 from an image input by the input unit 11. The extraction unit 15 inputs an image from the input unit 11. The extraction unit 15 inputs information representing a polygon from the vertex reducing unit 14. The extraction unit 15 extracts (cuts out) a portion represented in the information representing the polygon in the image. The extraction unit 15 outputs the portion of the extracted image to the conversion unit 16.

The conversion unit 16 is a functional unit that converts (corrects) the portion of the polygon extracted by the extraction unit 15 into a shape of a polygon set in advance. The conversion unit 16 may calculate a size after conversion (a size after correction) based on a size of the portion of the polygon extracted by the extraction unit 15. For example, in the example of the invoice described above, the conversion unit 16 converts a portion of a quadrilateral 200, which is not in the shape of a rectangle, extracted by the extraction unit 15 as illustrated in FIG. 2C into an image of a rectangle as illustrated in FIG. 2D. The conversion corrects an inclination (for example, the three-dimensional inclination described above) in the image of the extracted polygon. In addition, the numbers of vertices of the polygon between before conversion and after conversion, that is, values of n of polygons with n angles are the same.

Figure 10:
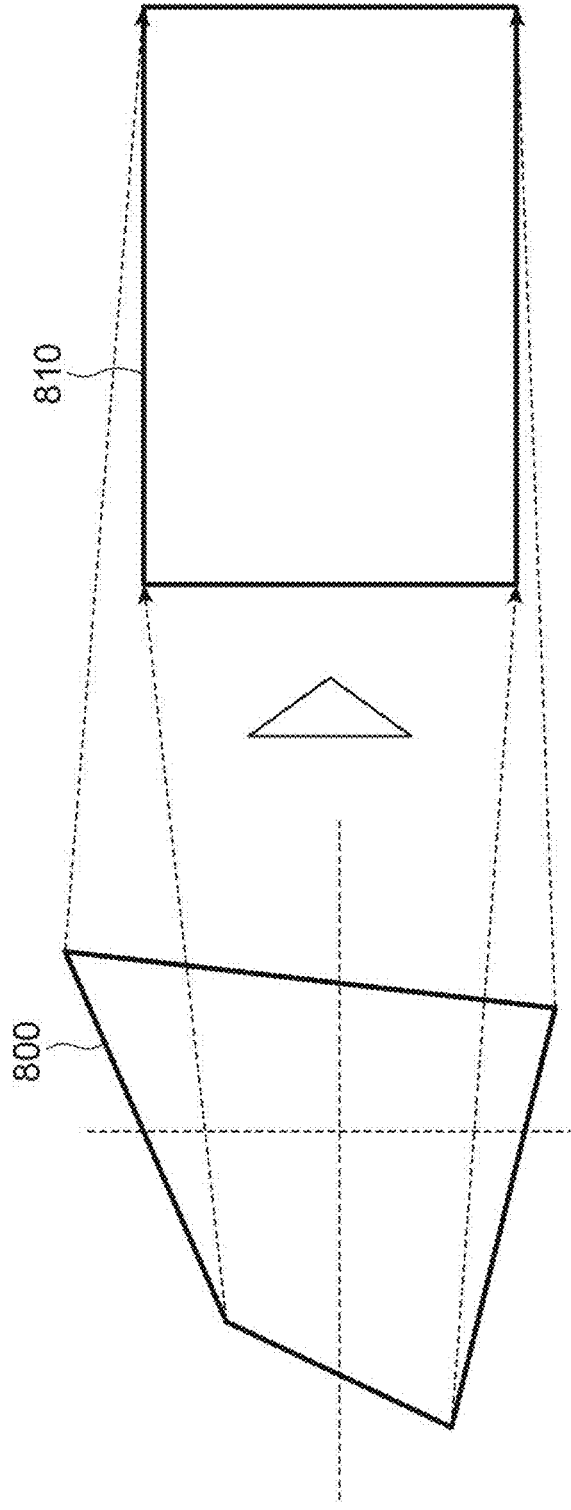
FIG. 10 is a diagram schematically illustrating a conversion of an image.

The conversion unit 16 inputs the image of the extracted polygon from the extraction unit 15. For example, the conversion unit 16 performs enlargement/reduction of the original image that has been input through coordinate conversion to convert the original image into a shape of a polygon set in advance without any missing of the original image. A size (for example, an aspect ratio) of the image after conversion is set in advance at a conversion time point. For example, the setting may be performed in accordance with a user's operation on the image processing system 10 in accordance with the size of the invoice. As illustrated in FIG. 10, for example, coordinate conversion is performed by setting a vertex at which a sum of an x coordinate and a y coordinate is a maximum as a vertex of the image 810 after conversion on an upper right side and setting a vertex at which a sum of an x coordinate and a y coordinate is a minimum as a vertex of the image 810 after conversion on a lower left side with the center of the image 800 extracted from the extraction unit 15 as its origin. The coordinate conversion is performed using a conventional method, for example, projective transformation of an image. As described above, in a case in which an inclination of a portion that is an extraction target is within 45 degrees, relative positional relations between upper right, upper left, lower left, and lower right from the center may be kept also after the conversion into a rectangle. In addition, the conversion may be performed using a method other than those described above.

Figures 11A, 11B:
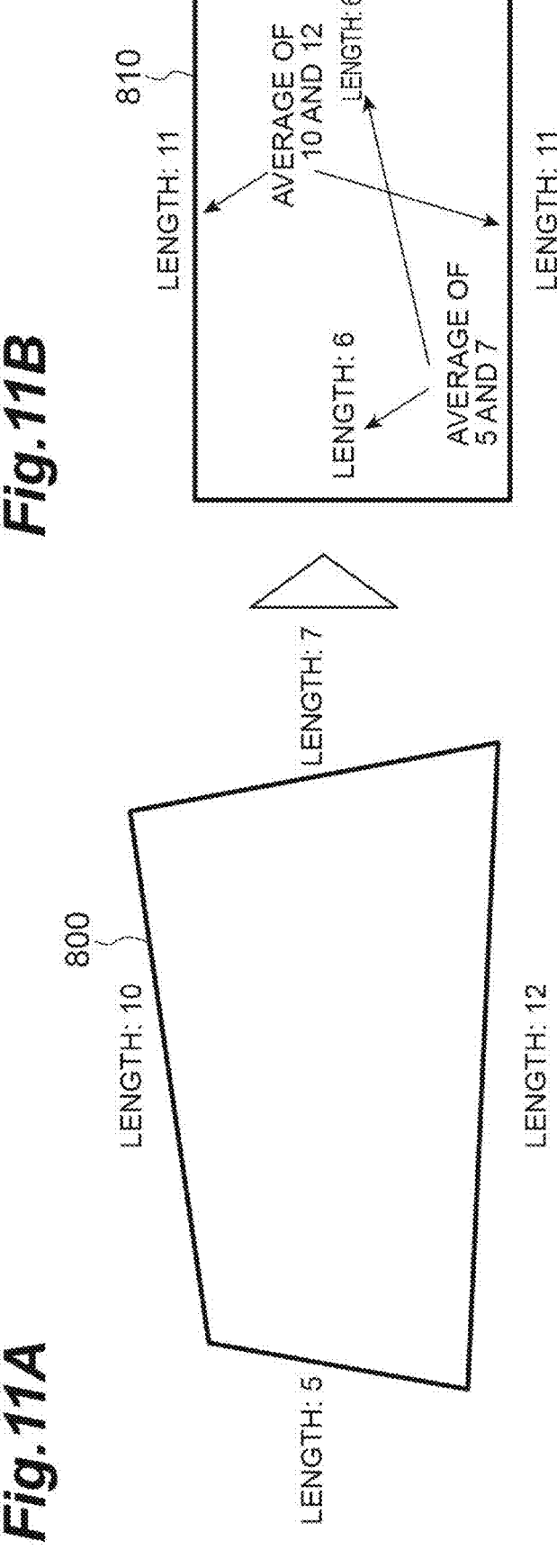
FIGS. 11A-11B are diagrams illustrating an example of calculation of a size of an image after conversion.

In addition, the conversion unit 16 may calculate a size after conversion based on a size of an image input from the extraction unit 15 and may perform conversion into the calculated size after conversion. For example, as illustrated in FIG. 11A, the conversion unit 16 may calculate a length of each side of an image 800 input from the extraction unit 15 and, as illustrated in FIG. 11B, set averages of lengths of sides facing each other as vertical/horizontal lengths of the image 810 after conversion. In addition, calculation of a size after conversion may be performed using a method other than those described above.

The conversion unit 16 outputs an image acquired through conversion. For example, the conversion unit 16 outputs this image to a database of the image processing system 10 and stores the image therein. Alternatively, the conversion unit 16 may output the image by transmitting it to another device. In addition, the conversion unit 16 may output the image using a method other than those described above. The functions of the image processing system 10 according to this embodiment are as described above.

Figure 12:
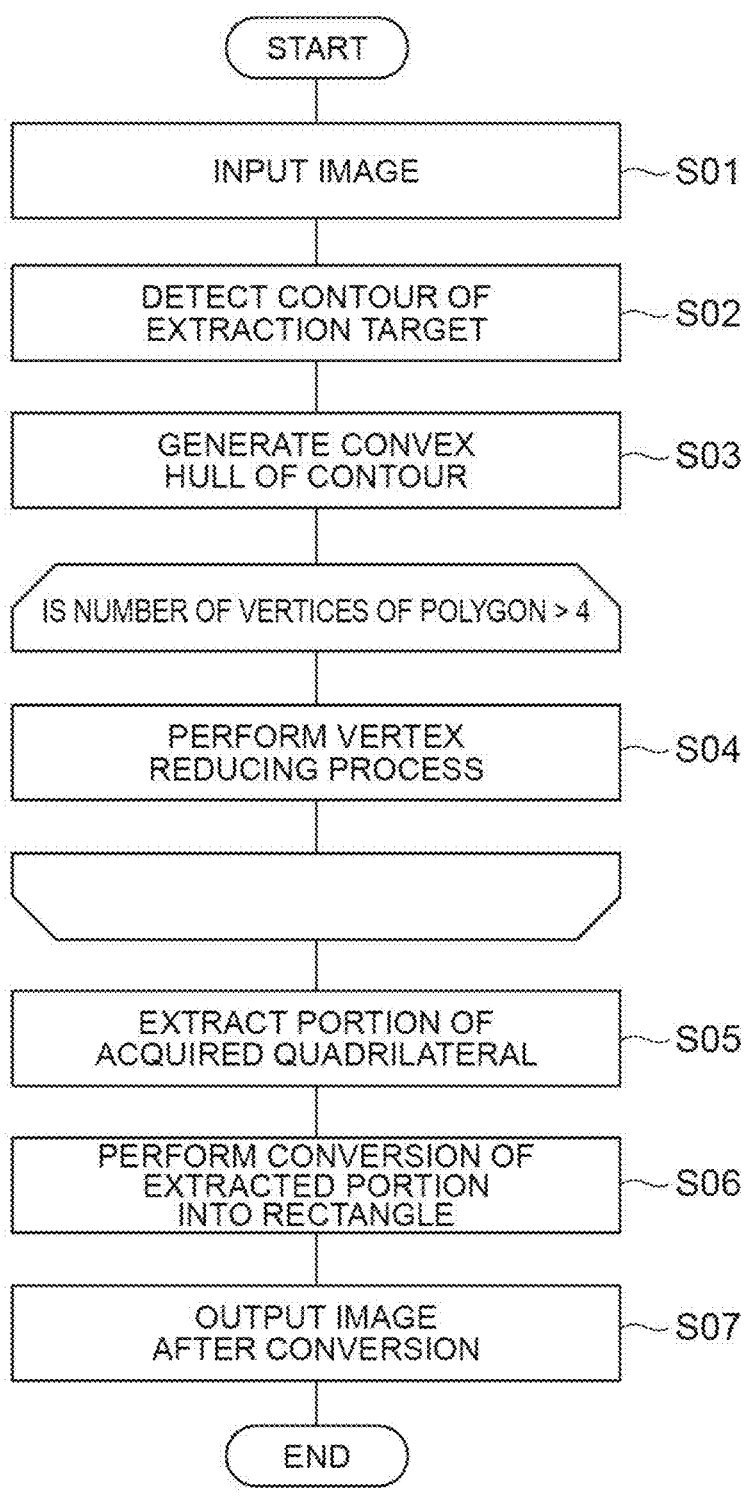
FIG. 12 a flowchart illustrating a process performed by an image processing system according to an embodiment of the present invention.

Subsequently, a process performed by the image processing system 10 according to this embodiment (an operation method performed by the image processing system 10) will be described with reference to a flowchart illustrated in FIG. 12.

In this process, first, an image including an extraction target is input by the input unit 11 (S01). Subsequently, a portion of the extraction target, more specifically, a contour of the extraction target is detected from the image input by the input unit 11 using the detection unit 12 (S02). Subsequently, a convex hull, which is a polygonal, of the contour of the extraction target is generated by the convex hull generating unit 13 (S03). Subsequently, a vertex reducing process of eliminating a vertex according to each interior angle of the polygon is performed by the vertex reducing unit 14 (S04). The vertex reducing process (S04) using the vertex reducing unit 14 is repeatedly performed until the number of vertices of the polygon becomes a number set in advance (in the example of the invoice described above, 4). In addition, an initial vertex reducing process is performed on the convex hull generated by the convex hull generating unit 13.

Subsequently, a portion of the polygonal (a quadrilateral in the example of the invoice described above) acquired by repeating the vertex reducing process using the vertex reducing unit 14 is extracted from the image input by the input unit 11 by using the extraction unit 15 (S05). Subsequently, the portion of the polygon extracted by the extraction unit 15 is converted into a shape of a polygon set in advance (a rectangle in the example of the invoice described above) by the conversion unit 16 (S06). Subsequently, the image after conversion is output by the conversion unit 16 (S07). The process performed by the image processing system 10 according to this embodiment has been described above.

In this embodiment, a portion of a polygon having a preset number of vertices, which is not limited to a rectangle, is extracted from an image. For example, in the example of the invoice described above, a portion of an arbitrary quadrilateral is extracted. In this embodiment, for example, even in a case in which missing, wrinkles, and the like occur in an extraction target in an image, and a contour of the extraction target is not straight or clear, a portion of an appropriate polygon including the entire portion that is the detected extraction target may be extracted. More specifically, an extracted polygon may be formed to include the entire portion that is an extraction target, not to include a portion other than the extraction target as possibly, and to be appropriate as a shape to be extracted. In this way, according to this embodiment, a portion of a polygon may be appropriately extracted from an image.

In addition, according to this embodiment, determination of a portion to be extracted may be realized without using a method (for example, Mask R-CNN) for detecting a shape of an object using an artificial intelligence (AI) model generated through machine learning or the like. For this reason, according to this embodiment, extraction of an image may be performed without necessary preparation of learning data used for machine learning and the like. In addition, although detection of an extraction target different from that of learning data may not be performed in the learning-based method described above, in this embodiment, a polygon to be extracted is determined using a rule-based method as described above, and thus extraction of an arbitrary extraction target may be performed.

In addition, the vertex reducing process as in this embodiment is a process of eliminating a vertex relating to a largest interior angle of a polygon and may determine a new line such that an area used for determination for reduction is a minimum. According to this configuration, the vertex reduction process may be performed appropriately and reliably, and, as a result, a portion of an appropriate polygon may be extracted from the image. Here, the vertex reducing process may be performed such that a vertex of a polygon is eliminated in accordance with each interior angle of the polygon based on the area described above, and may not be performed as described above.

In addition, as in this embodiment, a portion of a polygon extracted from an image may be converted into a shape of a polygon set in advance, for example, a rectangle. According to this configuration, an image having high usefulness may be acquired. For example, a portion of an invoice that is not rectangular in an image may be acquired as an image of a rectangle such as imaged from the front.

Furthermore, when conversion of an image is performed, a size after conversion may be calculated based on a size of a portion of a polygon extracted by the extraction unit. According to this configuration, an image after conversion may be acquired without requiring in-advance setting and the like of a size of an image. Here, conversion of an image may not be performed, and the image processing system 10 may not include the conversion unit 16. In such a case, the extraction unit 15 may output the extracted image.

Each block diagram used for description of the embodiment described above illustrates blocks in units of functions. Such functional blocks (component units) are realized by an arbitrary combination of at least one of hardware and/or software. In addition, a method for realizing each functional block is not particularly limited. In other words, each functional block may be realized by using one device that is combined physically or logically or using a plurality of devices by directly or indirectly (for example, using a wire or wirelessly) connecting two or more devices separated physically and/or logically. A functional block may be realized by one device or a plurality of devices described above and software in combination.

As functions, there are deciding, determining, judging, computing, calculating, processing, deriving, inspecting, searching, checking, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like, and the functions are not limited thereto. For example, a functional block (constituent unit) enabling transmitting is referred to as a transmitting unit or a transmitter. As described above, a method for realizing any of the functions is not particularly limited.

Figure 13:
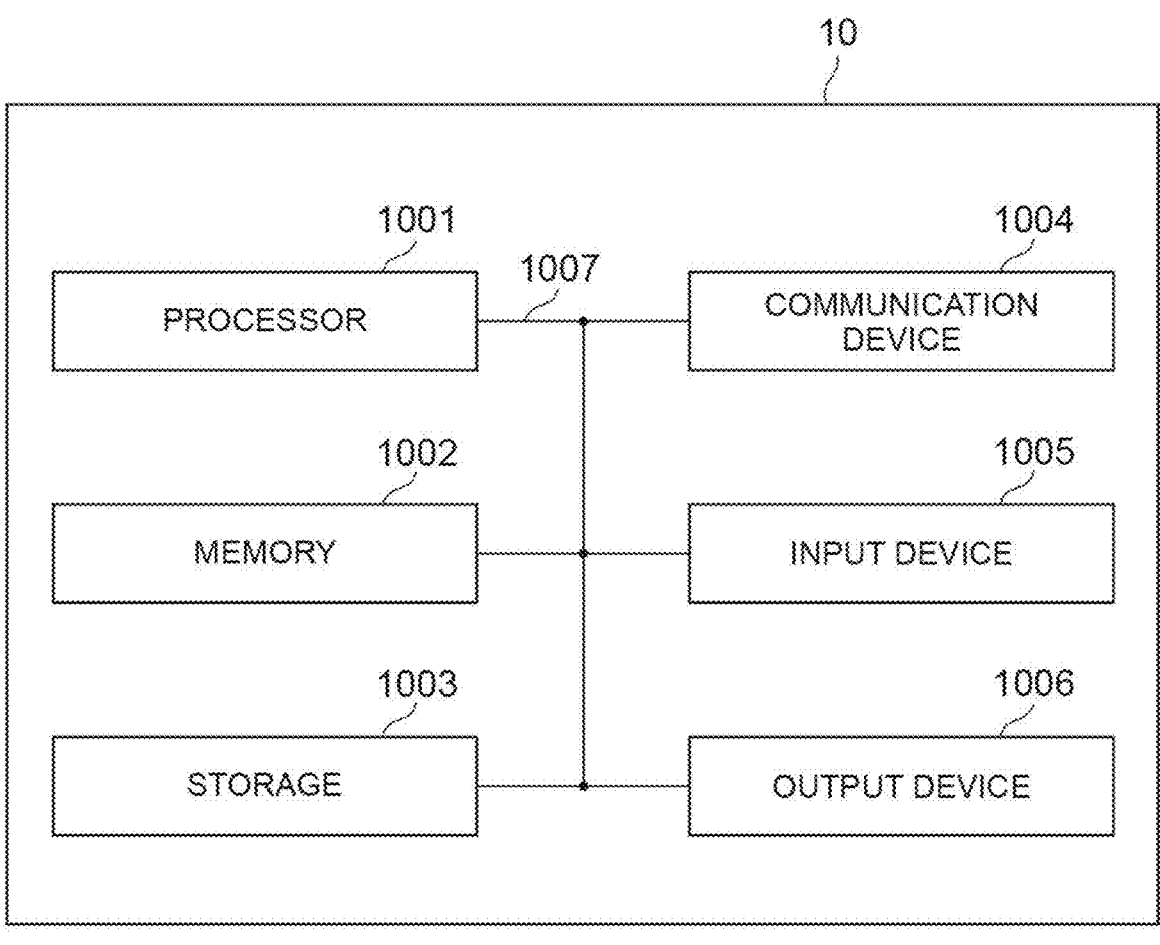
FIG. 13 is a diagram illustrating a hardware configuration of an image processing system according to an embodiment of the present invention.

For example, the image processing system 10 according to an embodiment of the present disclosure may function as a computer that performs information processing of the present disclosure. FIG. 13 is a diagram illustrating an example of a hardware configuration of the image processing system 10 according to an embodiment of the present disclosure. The image processing system 10 described above, physically, may be configured as a computer device including a processor 1001, a memory 1002, a storage 1003, a communication device 1004, an input device 1005, an output device 1006, a bus 1007, and the like.

In addition, in the following description, a term "device" may be rephrased as a circuit, a device, a unit, or the like. The hardware configuration of the image processing system 10 may be configured to include one or a plurality of devices illustrated in the drawing and may be configured without including some of these devices.

Each function of the image processing system 10 may be realized when the processor 1001 performs an arithmetic operation by causing predetermined software (e.g., a program) to be read onto hardware such as the processor 1001, the memory 1002, and the like, controls communication using the communication device 1004, and controls at least one of data reading from and data writing to the memory 1002 and the storage 1003.

The processor 1001, for example, controls the entire computer by operating an operating system. The processor 1001 may be configured by a central processing unit (CPU) including an interface with peripheral devices, a control device, an arithmetic operation device, a register, and the like. For example, each function of the image processing system 10 described above may be realized by the processor 1001.

In addition, the processor 1001 reads a program (program code), a software module, data, and the like from at least one of the storage 1003 and the communication device 1004 into the memory 1002 and executes various processes in accordance with these. As the program, a program causing a computer to execute at least some of the operations described in the embodiment described above is used. For example, each function of the image processing system 10 may be operated by a control program that is stored in the memory 1002 and operated by the processor 1001. Although the various processes described above have been described as being executed by one processor 1001, the processes may be executed simultaneously or sequentially by two or more processors 1001. The processor 1001 may be realized using one or more chips. In addition, the program may be transmitted from a network through a telecommunication line.

The memory 1002 is a computer-readable recording medium and, for example, may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), or the like. The memory 1002 may store a program (a program code), a software module, and the like executable for performing the information processing according to one embodiment of the present disclosure.

The storage 1003 is a computer-readable recording medium and, for example, may be configured by at least one of an optical disc such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium included in the image processing system 10, for example, may be a database including at least one of the memory 1002 and a storage 1003, a server, or any other appropriate medium.

The communication device 1004 is hardware (a transmission/reception device) for performing inter-computer communication through at least one of a wired network and a wireless network and, for example, may be called also a network device, a network controller, a network card, a communication module, or the like.

The input device 1005 is an input device (for example, a keyboard, a mouse, a microphone, a switch, buttons, a sensor, or the like) that accepts an input from the outside. The output device 1006 is an output device (for example, a display, a speaker, an LED lamp, or the like) that performs output to the outside. In addition, the input device 1005 and the output device 1006 may have an integrated configuration (for example, a touch panel).

In addition, devices such as the processor 1001, the memory 1002, and the like are connected using a bus 1007 for communication of information. The bus 1007 may be configured as a single bus or buses different between devices.

In addition, the image processing system 10 may be configured to include hardware such as a microprocessor, a digital signal processor (DSP), an application specific integrated circuit (ASIC), a programmable logic device (PLD), a field programmable gate array (FPGA), or the like, and a part or the whole of each functional block may be realized by the hardware. For example, the processor 1001 may be mounted using at least one of such hardware components.

The processing sequence, the sequence, the flowchart, and the like of each aspect/embodiment described in the present disclosure may be changed in order as long as there is no contradiction. For example, in a method described in the present disclosure, elements of various steps are presented in an exemplary order, and the method is not limited to the presented specific order.

The input/output information and the like may be stored in a specific place (for example, a memory) or managed using a management table. The input/output information and the like may be overwritten, updated, or added to. The output information and the like may be deleted. The input information and the like may be transmitted to another device.

A judgment may be performed using a value ("0" or "1") represented by one bit, may be performed using a Boolean value (true or false), or may be performed using a comparison between numerical values (for example, a comparison with a predetermined value).

The aspects/embodiments described in the present disclosure may be individually used, used in combination, or be switched therebetween in accordance with execution. In addition, a notification of predetermined information (for example, a notification of being X) is not limited to being performed explicitly and may be performed implicitly (for example, a notification of the predetermined information is not performed).

As above, while the present disclosure has been described in detail, it is apparent to a person skilled in the art that the present disclosure is not limited to the embodiments described in the present disclosure. The present disclosure may be modified or changed without departing from the concept and the scope of the present disclosure set in accordance with the claims. Thus, the description presented in the present disclosure is for the purpose of exemplary description and does not have any limited meaning for the present disclosure.

It is apparent that software, regardless of whether it is called software, firmware, middleware, a microcode, a hardware description language, or any other name, may be widely interpreted to mean a command, a command set, a code, a code segment, a program code, a program, a subprogram, a software module, an application, a software application, a software package, a routine, a subroutine, an object, an executable file, an execution thread, an order, a function, and the like.

In addition, software, a command, information, and the like may be transmitted and received via a transmission medium. For example, in a case in which software is transmitted from a website, a server, or any other remote source using at least one of a wiring technology such as a coaxial cable, an optical fiber cable, a twisted pair, a digital subscriber line (DSL) or the like and a radio technology such as infrared rays, radio waves, microwaves, or the like, at least one of such a wiring technology and a radio technology is included in the definition of the transmission medium.

Terms such as "system" and "network" used in the present disclosure are interchangeably used.

In addition, information, a parameter, and the like described in the present disclosure may be represented using absolute values, relative values with respect to predetermined values, or other corresponding information.

Terms such as "determining" used in the present disclosure may include various operations of various types. The "deciding" and "determining", for example, may include a case in which judging, calculating, computing, processing, deriving, investigating, looking up, search, and inquiry (for example, looking up a table, a database, or any other data structure), or ascertaining is regarded as "deciding" and "determining". In addition, "deciding" and "determining" may include a case in which receiving (for example, receiving information), transmitting (for example, transmitting information), input, output, or accessing (for example, accessing data in a memory) is regarded as "deciding: and "determining". Furthermore, "deciding" and "determining" may include a case in which resolving, selecting, choosing, establishing, comparing, or the like is regarded as "deciding" and "determining". In other words, "deciding" and "determining" includes a case in which a certain operation is regarded as "deciding" and "determining". In addition, "deciding (determining)" may be rephrased with "assuming", "expecting", "considering", and the like.

Terms such as "connected" or "coupled" or all the modifications thereof mean all the kinds of direct or indirect connection or coupling between two or more elements and may include presence of one or more intermediate elements between two elements that are mutually "connected" or "coupled". Coupling or connection between elements may be physical coupling or connection, logical coupling or connection, or a combination thereof. For example, "connection" may be rephrased with "access". When used in the present disclosure, two elements may be considered as being mutually "connected" or "coupled" by using one or more wires and at least one of a cable and a print electric connection and, as several non-limiting and non-comprehensive examples, by using electromagnetic energy such as electromagnetic energy having wavelengths in a radio frequency region, a microwave region, and a light (both visible light and non-visible light) region.

The description "based on" used in the present disclosure does not mean "based only on" unless otherwise noted. In other words, the description "based on" means both of "based only on" and "at least based on".

In the present disclosure, in a case in which names such as "first", "second", and the like is used, referring to each element does not generally limit the amount or the order of such an element. Such names may be used in the present disclosure as a convenient way for distinguishing two or more elements from each other. Accordingly, referring to the first and second elements does not mean that only the two elements are employed therein or the first element should precede the second element in a certain form.

In a case in which "include," "including," and modifications thereof are used in the present disclosure, such terms are intended to be inclusive like a term "comprising." In addition, a term "or" used in the present disclosure is intended to be not an exclusive logical sum.

In the present disclosure, for example, in a case in which an article such as "a," "an," or "the" in English is added through a translation, the present disclosure may include a plural form of a noun following such an article.

In the present disclosure, a term "A and B are different" may means that "A and B are different from each other". In addition, the term may mean that "A and B are different from C". Terms "separated", "combined", and the like may be interpreted similar to "different".

REFERENCE SIGNS LIST

10 Image processing system
11 Input unit
12 Detection unit
13 Convex hull generating unit
14 Vertex reducing unit
15 Extraction unit
16 Conversion unit
1001 Processor
1002 Memory
1003 Storage
1004 Communication device
1005 Input device
1006 Output device
1007 Bus

The invention claimed is:

1. An image processing system comprising:
an input device configured to input an image including an extraction target in accordance with a user's imaging operation, wherein the extraction target contains breakage or a wrinkle; and
circuitry configured to:
 detect a section of the image, wherein the section corresponds to the extraction target;
 generate a polygonal convex hull of the detected section;
 acquire a polygon having a preset number of vertices from the generated convex hull by repeating a vertex reducing process, wherein an elimination target vertex is eliminated from the convex hull during the vertex reducing process based on an interior angle at the elimination target vertex, to obtain the polygon, and wherein the vertex reducing process comprises:
  determining a first side based on an area of a region in the generated convex hull, wherein the region is surrounded by the first side, a second side, a third side, a fourth side and a fifth side, wherein the first side passes through the elimination target vertex, wherein the second side and the third side generates the elimination target vertex, wherein the fourth side extends from a sixth side which is adjacent to the second side, and wherein the fifth side extends from a seventh side which is adjacent to the third side; and
  generating the polygon after elimination of the elimination target vertex, wherein the polygon comprises the first side, the fourth side, the fifth side, the sixth side and the seventh side; and
 extract a portion from the image based on the acquired polygon; and
an output device configured to output a signal indicating the portion.

2. The image processing system according to claim 1, wherein the image is acquired from an invoice and the extraction target is the invoice in the image.

3. The image processing system according to claim 2, wherein the invoice has a rectangular shape and the detected section has a non-rectangular shape.

4. The image processing system according to claim 3, wherein the detected section extends in a longitudinal direction that is within 45 degrees with respect to an extending direction of the image.

5. The image processing system according to claim 1, wherein the image is acquired from at least one document selected from the group consisting of an invoice, a tag label, a payment slip, a ticket, a check, a voucher, a delivery statement, a delivery goods list and a document evidence.

6. The image processing system according to claim 1, wherein pixels forming a contour of the section in the image and an order of the pixels are detected, so that the section is detected in a raster form.

7. The image processing system according to claim 6, wherein centers of the pixels are sequentially connected to generate a prior form of the convex hull, and wherein the prior form of the convex hull has a polygonal shape.

8. The image processing system according to claim 1, wherein the generating the convex hull comprises a sequence of:
 identifying a removal target vertex, wherein an interior angle at the removal target vertex exceeds 180 degrees;
 connecting two vertices which are adjacent to the removal target vertex with a segment; and
 setting the segment as a side of the convex hull to be generated.

9. The image processing system according to claim 8, wherein the sequence is repeated until each interior angle of a prior form of the convex hull is under 180 degrees.

10. The image processing system according to claim 8, wherein in the generating the convex hull, a vertex at which an interior angle is under 180 degree is set as a vertex of the convex hull.

11. The image processing system according to claim 1, wherein coordinates of vertices forming a contour of the section in the image and segments connecting the coordinates are detected, so that the section is detected in a vector form.

12. The image processing system according to claim 1, wherein a number of vertices of the convex hull is greater than four and the preset number of vertices of the polygon after the elimination target vertex is eliminated is four.

13. The image processing system according to claim 1, wherein in the vertex reducing process, the interior angle at the elimination target vertex is a largest interior angle of the convex hull.

14. The image processing system according to claim 1, wherein in the determining, the first side is determined so as to minimize the area of the region.

15. The image processing system according to claim 1, wherein the circuitry is further configured to convert the extracted portion into a predetermined shape.

16. The image processing system according to claim 15, wherein the extracted portion is converted from a quadrilateral shape to a rectangle.

17. The image processing system according to claim 15, wherein a size of the predetermined shape after conversion is calculated based on a size of the extracted portion before the conversion.

18. The image processing system according to claim 17, wherein an average of lengths of two sides facing each other of the extracted portion before the conversion is set as a length of two corresponding sides of the predetermined shape after the conversion.

19. An image processing system comprising:
an input device configured to input an image including an extraction target in accordance with a user's imaging operation, wherein the extraction target contains breakage or a wrinkle; and
circuitry configured to:
 detect a section of the image, wherein the section corresponds to the extraction target;
 generate a polygonal convex hull of the detected section;
 acquire a polygon having a preset number of vertices from the generated convex hull by repeating a vertex reducing process, wherein an elimination target vertex is eliminated from the convex hull during the vertex reducing process based on an interior angle at the elimination target vertex, to obtain the polygon; and
 extract a portion from the image based on the acquired polygon.

20. An image processing system comprising:

a camera configured to input an image including an extraction target in accordance with a user's imaging operation, wherein the extraction target contains breakage or a wrinkle; and circuitry configured to:

detect a section of the image, wherein the section corresponds to the extraction target;

generate a polygonal convex hull of the detected section;

acquire a polygon having a preset number of vertices from the generated convex hull by repeating a vertex reducing process, wherein an elimination target vertex is eliminated from the convex hull during the vertex reducing process based on an interior angle at the elimination target vertex, to obtain the polygon; and extract a portion from the image based on the acquired polygon.

* * * * *